United States Patent [19]

Buseth et al.

[11] 4,287,914
[45] Sep. 8, 1981

[54] SELF SEALING COUPLING WITH FULL FLOW RELIEF VALVE

[75] Inventors: Richard A. Buseth; William C. Marrison, both of Jackson, Mich.

[73] Assignee: Aeroquip Corporation, Jackson, Mich.

[21] Appl. No.: 112,639

[22] Filed: Jan. 16, 1980

[51] Int. Cl.³ .................. F16L 37/28; F16K 31/12
[52] U.S. Cl. ................................ 137/613; 137/508; 137/614.03; 251/149.8
[58] Field of Search ............... 137/508, 614.03, 613, 137/614.2, 614, 506; 251/149.6, 149.8

[56] References Cited

U.S. PATENT DOCUMENTS 3,039,794  6/1962  DeCenzo ............... 137/614.03
3,054,420  9/1962  Williams ................. 137/508
3,195,935  7/1965  Beebee ................... 137/614.03
3,446,245  5/1969  Snyder, Jr. ............. 137/614.03
3,856,043  12/1974  Feild et al. ............ 137/508
3,993,361  11/1976  Stelzer .................. 137/508

Primary Examiner—Martin P. Schwadron
Assistant Examiner—A. Michael Chambers
Attorney, Agent, or Firm—Beaman & Beaman

[57] ABSTRACT

A self sealing fluid coupling utilizing separable interconnectable fittings wherein valve structure within one of the fittings simultaneously functions as the associated self sealing valve and as a pressure relief valve adapted to open and relieve excessive internal fluid pressure when the fitting is uncoupled. The combination self sealing and relief valve comprises an axially slidable sleeve including a radial surface exposed to internal fluid pressures for producing axial forces on the sleeve which are counteracted by a spring.

6 Claims, 3 Drawing Figures

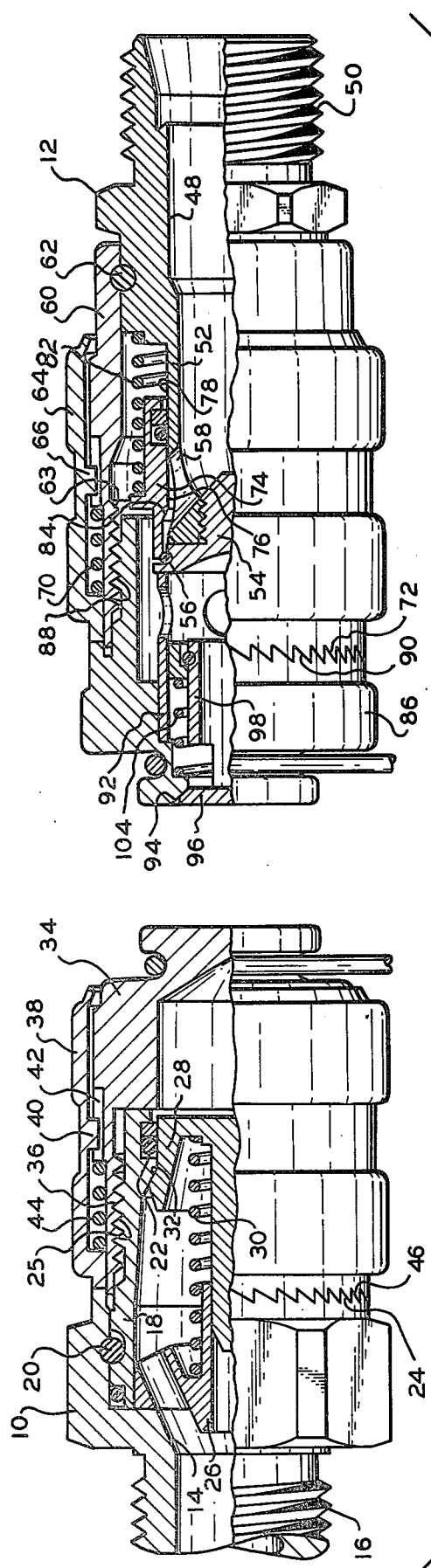
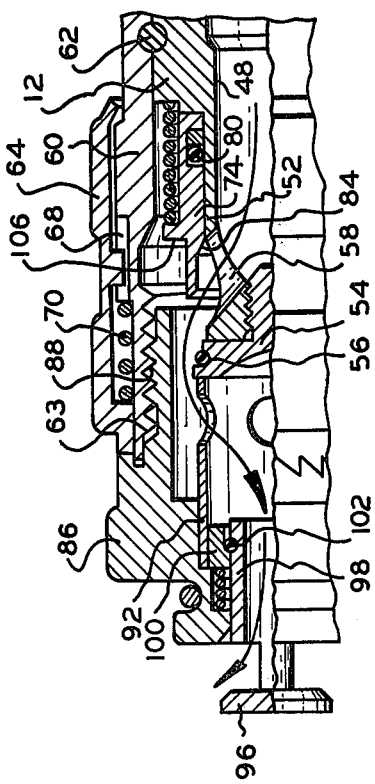
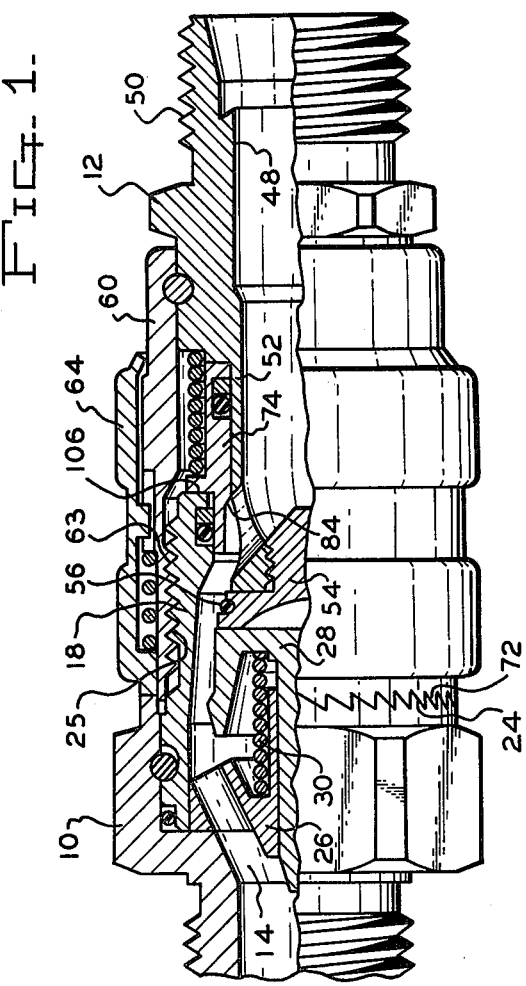
Fig. 1.
Fig. 2.
Fig. 3.

4,287,914

SELF SEALING COUPLING WITH FULL FLOW RELIEF VALVE

BACKGROUND OF THE INVENTION

Self sealing fluid couplings consist of a pair of annular fittings each having a passage defined therein communicating at one end with a conduit system, such as a hose line, and each having an interengageable coupling end which intermesh upon the fittings being coupled and latched together. Each fitting passage includes valve structure, usually spring biased, which closes upon the fittings being uncoupled, and which engage during fitting interconnection to mutually open each other as the fittings are being coupled. The valve structure is usually either of a poppet type, or constitutes a sliding sleeve. Pressurized fluid systems wherein hydraulic oil, or the like, is pressurized by means of a pump normally utilizes pressure relief means to prevent excessive pressures developing within the fluid distribution system. Usually, pressure relief valves consist of a valve member biased into a closed condition by spring means whose biasing forces is adjustable, and upon the fluid pressure exceeding the spring biasing force the valve opens permitting the pressurized medium to be released, such as returned to the reservoir. Conventionally, pressure relief valves constitute a separate component of a fluid distribution system, and in a fluid distribution system utilizing self sealing couplings and pressure relief valves separate components for such purposes are employed resulting in relatively high manufacturing costs.

It is an object of the invention to incorporate pressure relief valve means into a self sealing coupling fitting wherein upon the fitting being uncoupled it will function for pressure relief purposes.

It is a further object of the invention to provide a combination self sealing and pressure relief valve structure within a coupling fitting wherein a single displaceable valve element is employed for both self sealing and pressure relief purposes.

An additional object of the invention is to provide a combination self sealing and pressure relief coupling fitting wherein pressure relief is provided with a minimum of expense without addition to the dimensions of a fluid conduit system.

In the practice of the invention a self sealing coupling fitting includes a passage through which flow is controlled by an axially displaceable sleeve valve element biased toward a valve seat. Upon the coupling fitting being coupled to a mating fitting the sleeve is engaged by the other fitting and axially translated to an open position during coupling. Upon the fitting being uncoupled the sleeve valve is automatically closed by its spring.

The sleeve valve includes radially disposed surfaces exposed to the fitting internal fluid pressure, and the fluid pressure acting upon such surfaces tends to bias the sleeve valve element toward its open position counter to the force produced by the associated spring. Upon such fluid produced force exceeding the spring force the valve is axially displaced from its associated valve seat permitting fluid to escape from the uncoupled fitting. The "relief" pressure at which the valve element opens is determined by the dimension of the valve element's surface upon which the fluid pressure is acting, and the force produced by the valve element spring. These variable factors are predetermined for each fluid system assuring dependable operation at the desired relief pressure.

Preferably, a dust plug is placed within the fitting upon being uncoupled to prevent foreign matter from entering the coupling, and a port defined in the plug closed by a spring biased valve permits fluid to escape the fitting upon being relieved from the fluid system, and this spring biased valve effectively functions to prevent foreign matter from entering the coupling fitting.

BRIEF DESCRIPTION OF THE DRAWINGS

The aforementioned objects and advantages of the invention will be appreciated from the following description and accompanying drawings wherein:

FIG. 1 is an exposed view illustrating the two fittings of a coupling in accord with the invention, in the uncoupled condition, and wherein dust plugs are located within each fitting coupling end, FIG. 2 is a partial, sectional view of the fitting utilizing the pressure relief valve structure illustrating the position of the valve element, and dust plug port valve, during pressure relief, and FIG. 3 is an elevational, partially sectioned, view of a coupling in accord with the invention illustrating the fittings in coupled relationship with the valve components in the fully open condition.

DESCRIPTION OF THE PREFERRED EMBODIMENT

With reference to FIG. 1, a coupling in accord with the invention consists of a pair of interconnectable fittings 10 and 12. The fittings are of such configuration as to be interconnected as shown in FIG. 3 wherein fluid flow therebetween takes place, and upon the fittings being uncoupled from each other valve structure therein immediately closes the fittings' passages to prevent the escape of the pressurized medium, usually hydraulic fluid.

Fitting 10 comprises a body of tubular configuration defining a passage 14 having a conduit system connection end defined by external threads 16, and a coupling end at the right of the body. The threads 16 permit the body to be connected to a hose, pipe, tank or other component of the associated fluid system, and the body includes a tubular sleeve 18 mounted within the passage 14 by a drive wire 20 received within an annular groove defined in the sleeve. The sleeve includes an O-ring 22 for cooperating with the fitting 12, as will be later described.

Externally, the fitting 10 is provided with a plurality of serrated teeth 24, which cooperate with the latching structure, and the exterior of the sleeve is provided with quick release, i.e. high pitch, threads 25 upon which the fitting 12 is threaded during coupling.

Internally, the fitting 10 is provided with a coaxial spider 26 upon which the valve 28 is slideable for axial movement under the biasing influence of the compression spring 30. The compression spring 30 biases the valve toward the right for engagement with the O-ring 22 and valve seat 32 defined on the sleeve 18. Thus, in the uncoupled condition, the valve 28 will be biased to the closed position shown in FIG. 1 preventing fluid flow through the passage 14.

In order to prevent foreign matter from entering the fitting coupling end when the fitting 10 is uncoupled from fitting 12, a dust cover or plug 34 is preferably mounted upon the fitting 10 as illustrated in FIG. 1. The dust cover includes a body having an axially extending projection internally threaded at 36 for cooperation with the sleeve threads 16. Externally, the dust plug 34 includes a knurled sleeve 38 mounted on the plug for limited axial movement thereto as determined by the key 40 received within the body slot 42. Compression spring 44 biases the sleeve 38 toward the left with respect to the plug body. Serrated teeth 46 defined on the sleeve cooperate with the fitting teeth 24, and upon the plug being threaded upon threads 25 the engagement of the sleeve teeth 46 with fitting teeth 24 will prevent rotation of the plug in a direction which would permit the plug to be removed from the fitting 10. When it is desired to remove the plug 34 the sleeve 38 is pulled to the right against the force of spring 44, and the plug rotated in a counterclockwise direction unthreading threads 25 and 36. The aforementioned latching structure is well known in the fluid coupling art.

The fitting 12 includes a tubular body having a passage 48 defined therein, and the body includes exterior threads 50 for permitting a hose fitting, or other conduit system fitting, to be attached thereto. The left end of the body constitutes a coupling end. Internally, passage 48 is defined by the cylindrical projection 52 which forms a spider upon which the abutment cap 54 is mounted. The cap 54 includes an annular resilient seal 56 constituting a valve seat, and ports 58 permit fluid flow from the passage 48 around the valve seat seal when the associated valve element is in the open position as indicated by the arrows in FIG. 2.

An annular nut 60 is rotatably mounted upon the fitting body by drive wire 62, and the nut includes internal quick release threads 63 corresponding to the pitch and configuration of the threads 25 of fitting 10. A locking sleeve 64 is mounted upon the nut 60 for rotation therewith due to the cooperation of sleeve key 66 within nut slot 68, and compression spring 70 biases the sleeve toward the left. The left end of the sleeve 64 includes serrated teeth 72.

Valving of the fitting 12 is achieved by the valve element 74 which is in the form of a tubular sleeve having an inner cylindrical surface 76 adapted to axially slide upon the cylindrical projection body surface 78. An O-ring 80 defined in the valve element establishes sealing between the valve element and body surface 78, and a compression spring 82 interposed between the fitting body and valve element biases the valve element toward the left wherein the valve nose will sealingly engage the valve seat seal 56 as shown in FIG. 1. The valve element is provided with a reduced diameter nose portion which forms an oblique, radially extending surface 84 facing the valve seal 56, and it will be appreciated that the valve surface 84 is in communication with the pressurized fluid within passage 48 through the ports 58.

In FIG. 1, a dust plug 86 is illustrated as mounted within the coupling end of the fitting 12, and the dust plug includes an annular extending portion having threads 88 defined thereon for cooperation with the nut threads 63. Externally, the plug is provided with serrated teeth 90 for cooperation with the teeth 72 of the latching sleeve for maintaining the plug within the fitting.

Internally, plug 86 includes a ported sleeve 92 having openings which communicate with the fitting coupling end, and the plug includes a coaxial port 94 which receives a valve 96 mounted on the tubular stem 98. Stem 98 includes a radially disposed abutment ring 100 positioned on the stem by drive wire 102, and compression spring 104 interposed between plug 86 and ring 100 biases the valve 96 into a sealed relationship with the port 94.

Preferably, the dust plugs 34 and 86 will be mounted within the coupling ends of the fittings 10 and 12 in the manner shown in FIG. 1. In the event that the pressure within passage 48 of fitting 12 exceeds the desired value the fluid forces acting upon the surface 84 will produce a vector force endeavoring to move the valve element 74 toward the right against the spring 82. Upon the pressure within passage 48 reaching such a value that the axial force vector toward the right exceeds the biasing force of the spring 82 the valve element 74 will be axially displaced toward the right unseating the valve element nose from valve seat seal 56 and permitting fluid to flow through the ports 58 and into sleeve 92, and a buildup of such pressure within the sleeve will move the stem 98 and valve 96 to the left against the compression force of spring 104 permitting the pressurized medium to escape from the fitting as indicated by the arrows of FIG. 2.

Such movement of the valve element 74 under excessive pressures in fitting 12 will relieve such excessive pressures and soon permit the spring 82 to displace the valve element to the left against valve seal 56 to again seal the fitting passage 48. By regulating the dimension of the surface 84 defined on the valve element, and by employing a spring 82 having a known biasing force, the designer can readily predetermine the internal fluid pressure necessary to "open" valve element 74, and thus the safety requirements of the conduit system with which fitting 12 is employed will be met.

When it is desired to couple the fittings 10 and 12, the plug 34 is removed from fitting 10 by displacing sleeve 38 to the right and unscrewing the plug from fitting 10. Plug 86 is released from fitting 12 by displacing sleeve 64 to the right, and unthreading plug 86 from threads 63. Thereupon the fittings 10 and 12 may be coaxial aligned with their coupling ends in aligned and opposed relationship, and the threads 25 will mate with the threads 63 upon relative rotation occuring between the nut 60 and the sleeve 18. Release of the sleeve 64 permits the threaded teeth 72 to engage the teeth 24, as apparent in FIG. 3, preventing relative rotation between the nut 60 and sleeve 18 assuring a coupled relationship between fittings 10 and 12.

When fully coupled, the end of the sleeve 18 engages the valve element abutment surface 106 displacing the valve element 74 to the fully open position as shown in FIG. 3. Simultaneously, the engagement of the cap 54 with the valve 28 displaces the valve to the left relative to valve seat 32 opening the passage 14 to fluid flow. Thus, upon the fittings 10 and 12 being fully coupled an open flow path through the coupling is produced.

Upon shifting the sleeve 64 to the right to disengage serrated teeth 24 and 72, the nut 60 may be rotated to disengage the threads 25 and 63 permitting the fittings to uncouple. Such uncoupling permits the spring 82 to bias the valve element 74 against valve seal 56, and valve 28 will engage the valve seat 32, and the self sealing function of the coupling fittings is completed.

It will therefore be appreciated that by predetermining the area of surfaces upon valve element 74 exposed to the fluid pressure within fitting passage 48, and by utilizing a valve element spring 82 of known resilient characteristics, the valve element 74 will function as a pressure relief valve, as well as a flow passage valve actuated by the coupling procedure. This dual purpose of the valve element 74 adds no structural radial dimensions to the fitting 12, and a fitting constructed in accord with the invention produces both self sealing and pressure relief at a cost substantially less than that required when the pressure relief valve constitutes a separate component of the fluid system.

It is appreciated that various modifications to the inventive concepts may be apparent to those skilled in the art without departing from the spirit and scope of the invention.

We claim:

1. A self sealing quick disconnect fluid coupling fitting for use with a pressurized fluid system adapted to be selectively coupled and uncoupled to another fitting characterized by its ability to function as a pressure relief valve when uncoupled, comprising, in combination, a tubular body having an axial passage defined therein, a conduit connection end and a coupling end, coupling means defined on said body adjacent said coupling end for coupling said body to said another fitting, valve structure mounted upon said body adjacent said coupling end adapted to automatically open and close upon said body being coupled and uncoupled at said coupling end, respectively, with respect to said another fitting, said valve structure comprising first and second valve members within said passage relatively movable between open and closed positions controlling fluid flow through said passage, one of said members being fixed relative to said body, positioning means supporting the other member on said body for axial movement thereto between a closed position engaging said one member and an open position axially spaced from said one member, said other member being engaged by said another fitting upon coupling of said fittings moving said other member to said open position, said other valve member further including at least one radially extending surface exposed to fluid pressure within said passage when said other member is in said closed position so oriented to said other member that fluid pressure exerted thereon produces an axial force on said other valve member in the direction of said member open position, and spring means axially biasing said other member in the direction of said member closed position counter to the fluid pressure force, the area of said surface and the force of said spring means being preselected to permit the fluid pressure within said passage to axially displace said other valve member to said open position upon the fluid pressure reaching a predetermined value whereby fluid pressure is released through said body coupling end.

2. In a self sealing coupling fitting as in claim 1, an abutment surface means defined on said other valve member accessible from said coupling end adapted to engage abutment surface means defined in said another fitting whereby said other valve member is axially displaced from said closed to said open position upon said fitting body being coupled to said another fitting.

3. In a self sealing fluid coupling fitting as in claim 1, said other valve member comprising a tubular sleeve slidable mounted on said body and coaxial therewith.

4. In a self sealing coupling fitting as in claim 1, said one valve member comprising a circular valve seat coaxially defined within said passage and said other valve member comprising an annular sleeve coaxially mounted on said body having an annular end adapted to sealingly engage said valve seat.

5. In a self sealing coupling fitting as in claim 4, an annular radially extending surface defined on said sleeve constituting said surface exposed to said fluid pressure.

6. In a self sealing coupling fitting as in claim 4, a plug received within said body coupling end, a port defined in said plug, a valve within said port movable between open and closed positions, a spring mounted on said plug biasing said valve toward its closed position, said valve being forced open against said spring upon fluid by-passing said sleeve upon said sleeve being displaced to its open position.

* * * * *